United States Patent [19]

Inoue et al.

[11] Patent Number: 4,929,665

[45] Date of Patent: * May 29, 1990

[54] THERMOPLASTIC RESIN COMPOSITION

[75] Inventors: Toshio Inoue, Osaka; Takayuki Mine, Nara; Hitoshi Izutsu, Osaka; Toshihide Yamaguchi, Izumi-ohtsu; Fumihiro Kobata, Izumi; Juheiji Kawabata, Takaishi, all of Japan

[73] Assignee: Dainippon Ink and Chemicals, Inc., Tokyo, Japan

[ * ] Notice: The portion of the term of this patent subsequent to Mar. 29, 2005 has been disclaimed.

[21] Appl. No.: 145,552

[22] Filed: Jan. 19, 1988

[30] Foreign Application Priority Data

Jan. 20, 1987 [JP] Japan .................................. 62-10938
Feb. 20, 1987 [JP] Japan .................................. 62-35576
Mar. 6, 1987 [JP] Japan .................................. 62-49911

[51] Int. Cl.$^5$ ...................... C08G 75/20; C08L 81/06; C08L 81/02

[52] U.S. Cl. ...................................... 524/500; 524/504; 524/537; 524/538; 524/539; 524/540; 524/502; 524/530; 523/435; 523/466; 525/64; 525/65; 525/391; 525/426; 525/445; 525/467; 525/471; 525/537; 525/189

[58] Field of Search ................. 525/537, 64, 65, 391, 525/426, 445, 467, 471, 189; 524/500, 502, 504, 537, 538, 539, 540, 530

[56] References Cited

U.S. PATENT DOCUMENTS

| | | | |
|---|---|---|---|
| 4,497,928 | 2/1985 | Dean | 525/189 |
| 4,708,983 | 11/1987 | Liang | 525/189 |
| 4,734,470 | 3/1988 | Kawabata | 528/388 |
| 4,748,169 | 5/1988 | Izutsu | 524/500 |

*Primary Examiner*—C. Warren Ivy
*Attorney, Agent, or Firm*—Sherman and Shalloway

[57] ABSTRACT

A resin composition comprising (a) 100 parts by weight of a block copolymer composed of polyphenylene sulfide segments and polyphenylene sulfide sulfone segments and (b) 0.01 to 20 parts by weight of at least one compound selected from the group consisting of epoxy resins, maleimide compounds, N,N'-diarylcarbodiimide compounds and organosilane compounds and as required, (c) an organic filler.

17 Claims, No Drawings

THERMOPLASTIC RESIN COMPOSITION

This invention relates to a thermosetting resin composition having excellent mechanical properties, particularly high flexural strength, which can be used, for example, as materials for injection molding, extrusion and compression molding.

The block copolymer composed of polyphenylene sulfide segments and polyphenylene sulfide sulfone segments which was developed by the present inventors (see U.S. patent application Ser. No. 929372 filed Nov. 12, 1986), now U.S. Pat. No. 4,734,470 is expected to find a broader range of applications as highly thermally stable engineering plastics because it has excellent dimensional accuracy while retaining almost the same properties as rapidly growing conventional polyphenylene sulfide polymers. Since the above block copolymer alone has low strength, attempts have been made to improve its strength by mixing it with various inorganic fillers such as glass fibers or carbon fibers. The resulting compositions, however, have not yet gained commercial acceptance because molded articles prepared from them have a poor appearance or no sufficient reinforcing effect can be obtained.

It is an object of this invention to remedy the above defect of the prior art.

The present inventors have made extensive investigations in order to achieve the above object by providing a thermoplastic resin composition having improved strength, especially improved flexural strength, and have found that a thermoplastic resin composition meeting the above object can be obtained by blending the above block copolymer with an epoxy resin, a maleimide compound, an N,N'-diarylcarbodiimide compound or an organosilane compound.

According to this invention, there is provided a resin composition comprising
(a) 100 parts by weight of a block copolymer composed of polyphenylene sulfide segments and polyphenylene sulfide sulfone segments and
(b) 0.01 to 20 parts by weight of at least one compound selected from the group consisting of epoxy resins, maleimide compounds, N,N'-diarylcarbodiimide compounds and organosilane compounds, and
(c) as required, an inorganic filler.

The invention also provides a resin composition comprising
(a) 99 to 1 parts by weight of a block copolymer composed of polyphenylene sulfide segments and polyphenylene sulfide sulfone segments,
(b) 1 to 99 parts by weight of another thermoplastic resin, and
(c) 0.01 to 20 parts by weight, per 100 parts by weight of the components (a) and (b) combined, of at least one compound selected from the group consiting of epoxy resins, maleimide compounds, N,N'-diarylcarbodiimide compounds and organosilane compounds, and
(d) as required, an inorganic filler.

The block copolymer used in this invention is a block copolymer composed of polyphenylene sulfide (to be referred to as PPS) segments containing

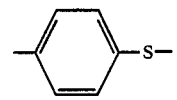

as main recurring units and polyphenylene sulfide sulfone (to be referred to as PPSS) segments containing

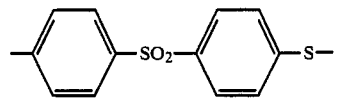

as main recurring units. It is used in the form of an uncured polymer, or a cured polymer, or a mixture of both.

Preferably, the block copolymer has a melt viscosity at 300° C. of 10 to 20,000 poises, particularly 500 to 10,000 poises. The weight ratio of the PPSS segments to the PPS segments in the block copolymer is preferably 1-99/99-1, but is properly selected to conform to the blending conditions for preparing the resin composition.

As disclosed in the specification of the above-cited U.S. patent application Ser. No. 929372, the above block copolymer is obtained, for example, by reacting the terminal groups of PPSS with the terminal groups of PPS. Hence, if the terminal groups of PPSS are chlorophenyl groups

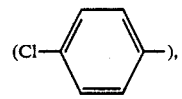

the terminal groups of PPS have to be converted to reactive groups such as sodium sulfide groups (NaS-). Such PPS may be obtained, for example, by reacting a sodium sulfide component and a p-dichlorobenzene component with the amount of the former being 1 to 20 mole % in excess of the latter.

The PPS segments constituting the block copolymer of this invention preferably contain at least 30 mole %, especially at least 70 mole %, of structural units represented by the general formula

If the amount of the structural units is less than 30 mole %, it is difficult to obtain a block copolymer having excellent properties. Preferably, PPS has a logarithmic viscosity [η] of 0.03 to 0.80.

The logarithmic viscosity [η] of the block copolymer is calculated in accordance with the equation [η]=ln (relative viscosity)/polymer concentration in which the relative viscosity is determined at 206° C. for a solution of the polymer in alpha-chloronaphthalene in a polymer concentration of 0.4 g/100 ml of solution.

This polymer can be produced, for example, by polymerizing a polyhalogenated aromatic compound such as p-dichlorobenzene in the presence of a sulfur source and sodium carbonate; polymerizing a polyhalogenated aromatic compound in an organic amide-type polar solvent in the presence of a combination of sodium sulfide or sodium hydrosulfide and sodium hydroxide, a combination of a sulfur source such as hydrogen sulfide and an alkali metal hydroxide such as sodium hydroxide, or a sodium aminoalkanoate; or by self-condensing p-chlorothiophenol. One suitable method is to react p-dichlorobenzene with sodium sulfide in an amide solvent such as N-methylpyrrolidone or dimethylacetamide or a sulfone-type solvent such as sulfolane. Preferably, a carboxylic acid, a sulfonic acid, an alkali metal phosphate, or an alkali hydroxide may be added to regulate the degree of polymerization of the polymer. Copolymer components which will give a meta-linkage

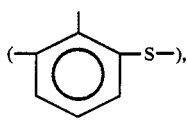

an ortho-linkage

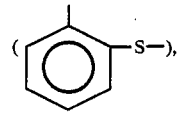

an ether linkage

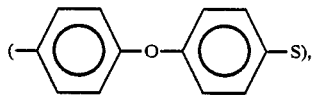

a sulfone linkage

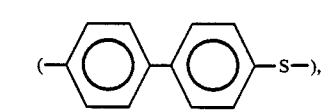

a biphenyl linkage

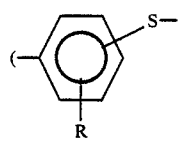

a substituted phenyl sulfide linkage

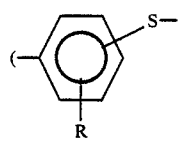

where R represents an alkyl group, a nitro group, a phenyl group, an alkoxy group, a carboxylic acid group or a metal carboxylate group), and a trifunctional linkage

may be used in an amount of not more than 30 mole % because in such amounts they do not greatly affect the crystallinity of the polymer. Preferably, the amount of the copolymer components is not more than 10 mole %. The amount of a copolymer component which gives a trifunctional or higher component such as a phenyl, biphenyl or naphthyl sulfide linkage is preferably not more than 3 mole %.

The polyhalogenated aromatic compound is a halogenated aromatic compound having at least two halogen atoms directly bonded to the aromatic ring. Specific examples include p-dichlorobenzene, m-dichlorobenzene, o-dichlorobenzene, trichlorobenzene, tetrachlorobenzene, dichloronaphthalene, trichloronaphthalene, dibromobenzene, tribromobenzene, dibromonaphthalene, diiodobenzene, triiodobenzene, dichlorodiphenylsulfone, dibromodiphenylsulfone, dichlorobenzophenone, dibromobenzophenone, dichlorodiphenyl ether, dibromodiphenyl ether, dichlorodiphenyl sulfide, dibromodiphenyl sulfide, dichlorobiphenyl, dibromobiphenyl and mixtures of these. Usually dihalogenated aromatic compounds are used, and p-dichlorobenzene is preferred. In order to increase the viscosity of the polymer by providing a branched structure, it is possible to use a small amount of a polyhalogenated aromatic compound having at least three halogen substituents per molecule in combination with the dihalogenated aromatic compound.

Suitable sulfidization agents may be alkali metal sulfide compounds, and combinations of a sulfur source and alkali metal hydroxide compounds.

The alkali metal sulfide compounds include, for example, lithium sulfide, sodium sulfide, potassium sulfide, rubidium sulfide, cesium sulfide, and mixtures of these. These alkali metal sulfides may be used as hydrates and/or aqueous mixtures, or in an anhydrous form. A small amount of an alkali metal hydroxide may be added in order to react it with an alkali metal bisulfide and an alkali metal thiosulfate present in trace amounts in the alkali metal sulfide. Sodium sulfide mono- to trihydrates are preferred as the alkali metal sulfide compound. Examples of the sulfur source are alkali metal hydrosulfide compounds, hydrogen sulfide, thioamide, thiourea, thiocarbamate, carbon disulfide, thiocarboxylate, sulfur and phosphorus pentasulfide. The alkali metal hydrosulfide compounds are preferred as the sulfur source. The alkali metal hydrosulfides include, for example, lithium hydrosulfide, sodium hydrosulfide, potassium hydrosulfide, rubidium hydrosulfide, cesium hydrosulfide and mixtures of these. These alkali metal hydrosulfide compounds may be used in the form of hydrates and/or aqueous mixtures or in an anhydrous form. Sodium hydrosulfide is preferred as the alkali metal hydrosulfide. It may be used in combination with an alkali metal hydroxide compound or instead, with sodium N-methyl-4-aminobutyrate or an alkali metal carbonate compound.

Examples of the alkali metal hydroxide compound are potassium hydroxide, sodium hydroxide, lithium hydroxide, rubidium hydroxide, cesium hydroxide, and mixtures of these. Sodium hydroxide is preferred.

The organic amide-type polar solvent may, for example, be selected from N,N-dimethylformamide, N,N-dimethylactamide, N-methyl-2-pyrrolidone, N-ethyl-2-pyrrolidone, N-methyl-epsilon-caprolactam, hexamethylphosphoramide, and mixtures of these. N-methyl-2-pyrrolidone (NMP) is especially preferred among these solvents.

The suitable proportion of the alkali metal hydroxide compound is 0.8 to 3.0 moles per mole of sulfur element in the sulfur source. When the alkali metal hydroxide compound is used in combination, its amount is suitably 0.9 to 1.2 moles for each 1.00 mole of the alkali metal hydrosulfide compound. If sodium N-methyl-4-aminobutyrate is used in combination, its amount is suitably 0.9 to 1.2 moles for each 1.00 mole of the alkali metal hydrosulfide.

When the hydrate of the alkali metal sulfide compound or the alkali metal hydrosulfide compound is used, it must be used in the reaction after it is dehydrated in a solvent. Dehydration of the alkali metal hydrosulfide is desirably carried out in the presence of the alkali metal hydroxide compound or sodium N-methyl-4-aminobutyrate.

The amount of the sulfidization agent is selected such that the proportion of sulfur element becomes 0.8 to 1.2 moles, preferably 0.9 to 1.1 moles, per mole of the dihalogenated aromatic compound. The amount of the organic polar solvent is 25 to 20 moles, preferably 3 to 10 moles, per mole of the dihalogenated aromatic compound.

Preferably, polymerization aids are added at the time of producing polyphenylene sulfide. Examples of the polymerization aids are organic sulfonic acid metal salts, lithium halides, metal carboxylates, and alkali phosphates.

PPSS constituting the block copolymer used in this invention is defined as a polymer having

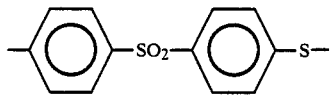

as recurring units. Preferably, it contains at least 70 mole % of recurring units represented by the general formula

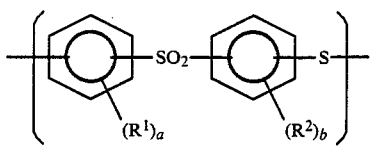

wherein groups bonded to both terminals of the polymer are ortho- or para- to the sulfone group, $R^1$ and $R^2$ represent hydrogen or a $C_1$–$C_8$ alkyl group and/or an aryl group, and a and b are integers of 0 to 4. If the proportion of the recurring units is less than 70 mole %, it is difficult to obtain a block copolymer having excellent properties. This polymer preferably has a molecular weight corresponding to a logarithmic viscosity $\eta_{inh}$ of 0.05 to 1.0. The logarithmic viscosity $\eta_{inh}$ is calculated in accordance with the equation $\eta_{inh}=\ln$ (relative viscosity)/polymer concentration in which the relative viscosity is determined at 30° C. for its solution in a phenol/1,1,2,2-tetrachloroethane (3:2 by weight) mixed solvent in a polymer concentration of 0.5/100 ml of solution. This polymer may be produced, for example, by reacting a dihalodiphenylsulfone with an alkali metal sulfide in an organic amide solvent (see U.S. Pat. No. 4,102,875. As a copolymer component, it may contain a sulfide linkage

an ether linkage

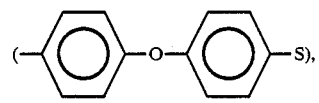

a carbonyl linkage a

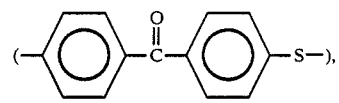

a substituted phenyl sulfide linkage

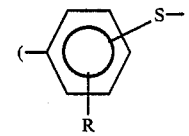

wherein R represents an alkyl group, a nitro group, a phenyl group, a carboxylic acid group, or a metal carboxylate group), a trifunctional linkage

etc. since such amounts do not greatly affect the properties of the polymer. Preferably, the proportion of the copolymer component is not more than 10 mole %.

Preferably, the dihalodiphenylsulfone is represented by the following general formula

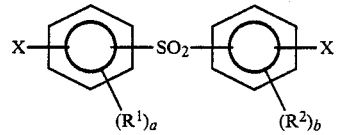

wherein X represents fluorine, chlorine, bromine or iodine ortho- or para- to the sulfone group, $R^1$ and $R^2$ represent hydrogen a $C_1$–$C_8$ alkyl group and/or an aryl group, and a and b are integers of 0 to 4.

Specific examples of the dihalodiphenylsulfone are bis(4-chlorophenyl)sulfone, bis(4-fluorophenyl)sulfone, bis(4-bromophenyl)sulfone, bis(4-iodophenyl)sulfone, bis(2-chlorophenyl)sulfone, bis(2-fluorophenyl)sulfone, bis(2-methyl-4-chlorophenyl)sulfone, bis(3,5-dimethyl- 4-chlorophenyl)sulfone, and bis(2,3,5,6-tetramethyl-4-chlorophenyl)sulfone. These compounds are used either singly or in combination. Especially preferred is bis(4-chlorophenyl)sulfone.

The halogenated aromatic compound, the sulfidization agent and the organic amide-type polar solvent used in the production of PPSS may be the same as those used to produce PPS.

The amount of the sulfidization agent used is 0.8 to 1.2 moles, preferably 0.9 to 1.1 moles, as sulfur element, per mole of the dihalodiphenylsulfone. The amount of the organic polar solvent used is 2.5 to 20 moles, preferably 3 to 10 moles, per mole of the dihalodiphenylsulfone. As required, polymerization aids may be used. The polymerization aids may be metal salts of organic sulfonic acids, lithium halides, metal salts of carboxylic acids and alkali phosphates which may be the same as mentioned hereinabove. The amount of the polymerization aids is usually 0.01 to 300 % by weight, preferably 0.5 to 200 % by weight, based on the dihalodiphenylsulfone.

In the production of PPSS, the reaction temperature is generally 50° to 250° C., preferably 80° to 220° C. The pressure should be one which maintains the polymerization solvent and the halogenated aromatic compound as a monomer substantially liquid, and is generally not more than 200 kg/cm$^2$, preferably not more than 20 kg/cm$^2$. The reaction time differs depending upon temperature and pressure, but is generally 10 minutes to about 72 hours, preferably 1 to 48 hours.

The epoxy resins used in this invention are liquids or solids containing one or more epoxy groups and preferably having a molecular weight of 100 to 4,000. Specific examples include glycidyl epoxy resins of the glycidyl ether type, for example glycidyl ethers of bisphenols such as bisphenol A, resorcinol, hydroquinone, pyrocatechol, bisphenol F, saligenin, 1,3,5-trihydroxybenzene, bisphenol S, trihydroxy-diphenyldimethylmethane, 4,4'-dihydroxybiphenyl, 1,5-dihydroxynaphthalene, cashew phenol and 3,3,5,5-tetrakis(4-hydroxyphenyl)hexane, glycidyl ethers of halogenated bisphenols and diglycidyl ether of butanediol; glycidyl epoxy resins of the glycidyl ester type such as glycidyl phthalate; glycidyl epoxy resins of the glycidyl amine type such as N-glycidylaniline; linear non-glycidyl epoxy resins such as epoxidized polyolefins and epoxidized soybean oil; and cyclic non-glycidyl epoxy resins such as vinylcyclohexene dioxide and dicyclopentadiene dioxide.

Novolak-type epoxy resins are the especially preferred epoxy resins in this invention. The novolak-type epoxy resins can be usually obtained by reacting novolak-type phenolic resins containing at least two epoxy groups with epichlorohydrin. The novolak-type phenolic resins are obtained by condensation reaction between phenols and formaldehyde. Suitable phenols as starting materials include, for example, phenol, o-cresol, m-cresol, p-cresol, bisphenol A, resorcinol, p-tertiary butyl phenol, bisphenol F, bisphenol S and mixtures of these. Epoxidized products of poly-p-vinylphenol may be used equally to the novolak-type epoxy resins. These novolak-type epoxy resins may contain halogen or a hydroxyl group, and if required, a mixture of two or more such novolak-type epoxy resins may be used.

Generally, epoxy resins are molded after incorporation of curing agents such as amines, acid anhydrides, polysulfides and phenolic resins. In the present invention, the epoxy resins desirably do not require curing agent; or even when a curing agent is used, the amount in moles of its active hydrogens is less than half of that of the epoxy groups. When a curing agent in ordinary amounts is used together, the reaction of the epoxy resin with the copolymer used in this invention is inhibited. Moreover, a crosslinkage is formed by the reaction of the epoxy resin with the curing agent and a stable increase in melt viscosity cannot be expected. The combined use of curing agents, however, is expected to prevent bleeding due to the addition of the epoxy resin or prevent degradation of thermal properties.

The amount of the epoxy esin used in this invention is 0.01 to 20 parts by weight, preferably 0.1 to 15 parts by weight, per 100 parts by weight of the block copolymer either aloner or with another thermoplastic resin. If the amount of the epoxy resin is less than 0.01 part by weight, the reinforcing effect is insufficient. If it is larger than 20 parts by weight, the resulting composition has an excessively lowered melt viscosity and its moldability and the appearance of a molded product from it are adversely affected.

The maleimide compounds used in this invention are compounds represented by the following general formula

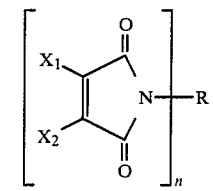

wherein R represents an aromatic, alicyclic or aliphatic organic group preferably having not more than 14 carbon atoms, $X_1$ and $X_2$ represent hydrogen, halogen or an alkyl group, and n is 1 to 10.

The maleimide compounds of the above formula may be produced by a known method comprising reacting maleic anhydride with a monoamine or a polyamine to prepare a maleamide acid, and then dehydrocyclizing the maleamide acid. The amines used are preferably aromatic amines in view of the thermal stability of the final composition. Where flexibility is desired, alicyclic amines and aliphatic amines may be used. Examples of preferred maleimide compounds include phenylmaleimide, N,N'-(methylene di-p-phenylene)dimaleimide, N,N'-(oxydi-p-phenylene)dimaleimide, N,N'-m-phenylenedimaleimide, N,N'-p-phenylenedimaleimide, N,N'-m-xylylenedimaleimide, N,N'-p-xylylenedimaleimide, N,N'-hexamethylenedimaleimide, and compounds of the following formula:

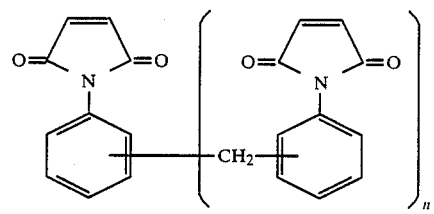

(n = 0.1–10)

Polyamino-bismaleimide which is the addition reaction product between N,N'-(methylene di-p- phenylene)dimaleimide and diaminodiphenylmethane may also be used.

The suitable amount of the maleimide compound to be added is 0.01 to 20 parts by weight, preferably 0.1 to 15 parts by weight, per 100 parts by weight of the block copolymer either alone or as a mixture with another thermoplastic resin. If the amount of the maleimide compound is less than 0.01 part by weight, the effect of thickening is not sufficient. If it is larger than 20 parts by weight, the moldability of the final composition is very adversely affected.

The N,N'-diarylcarbodiimide compounds used in this invention are compounds represented by the general formula

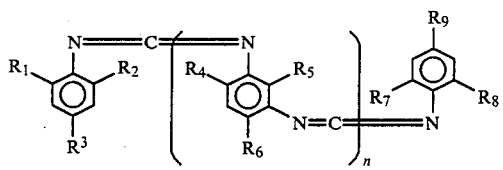

wherein $R_1$, $R_2$, $R_3$, $R_4$, $R_5$, $R_6$, $R_7$, $R_8$ and $R_9$ each represent hydrogen, halogen or an alkyl group having 1 to 4 carbon atoms, and n is 0 or an integer of 1 to 10.

Preferred examples of the carbodiimide compounds of the above formula include di-(2,6-diisopropyl phenyl)carbodiimide, di-(2,6-di-sec-butyl phenyl)carbodiimide, di-(2,6-dimethyl phenyl)carbodiimide, di-(2-methylphenyl)carbodiimide, di-(2,6-diethyl-4-methyl phenyl)carbodiimide, di-(2,6-diethyl-4-chloro phenyl)carbodiimide, di-(2,4,6-triisopropyl phenyl)carbodiimide, diphenyl carbodiimide, triisopropylbenzene polycarbodiimide, triethylbenzene polycarbodiimide, and 1-methyl-3,5-diisopropylbenzene polycarbodiimide.

The suitable amount of the cardodiimide compound to be added is 0.01 to 20 parts by weight, preferably 0.1 to 10 parts by weight, per 100 parts by weight of the block copolymer of PPS and PPSS.

The organosilane compounds used in this invention are those generally called silane coupling agents. They are compounds represented by the following formula or their polycondensates.

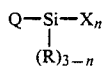

wherein Q represents a hydrocarbon group with or without a functional group such as a vinyl, acrylate, amino, halogen1, epoxy or mercapto group, preferably having 1 to 20 carbon atoms, R represents a lower alkyl group, X represents a chloro group or an alkoxy group, and n is 2 or 3.

Specific examples of the organosilane compounds of the above formula include vinyltrichlorosilane, vinyl tris(beta-methoxyethoxy)silane, vinyltriethoxysilane, vinyltrimethoxysilane, gamma-methallyloxypropyltrimethoxysilane, beta-(3,4-epoxycyclohexyl)ethyltrimethoxysilane, gamma-glycidoxypropyltrimethoxysilane, gamma-glycidoxypropylmethyldiethoxysilane, N-beta(aminoethyl)-gamma-aminopropyltrimethoxysilane, N-beta-(aminoethyl)-gamma-aminopropylmethyldimethoxysilane, gamma-aminopropyltriethoxysilane, N-phenyl-gamma-aminopropyltrimethoxysilane, gamma-mercaptopropyltrimethoxysilane, gamma-chloropropyltrimethoxysilane, n—$C_{10}H_{21}(OCH_3)_3$, $CF_3(CF_2)_7CH_2CH_2Si(OCH_3)_3$, N-cyclohexyl-delta-aminopropyltrimethoxysilane, N-beta-(N-vinylbenzylamino)ethyl-delta-aminopropyltrimethoxysilane, delta-ureidopropyltriethoxysilane and gamma-glycidoxypropylmethyldiisopropenoxysilane.

The amount of the organosilane to be added is 0.01 to 20 parts by weight, preferably 0.1 to 10 parts by weight, per 100 parts by weight of the block copolymer either alone or as a mixture with another thermoplastic resin. If it is less than 0.01 part by weight, water absorption and heat distortion property are not fully improved. If it exceeds 20 parts by weight, the resulting composition undesirably has reduced thermal stability.

In the present invention, another thermoplastic resin may be used in combination with each other. Examples of the other thermoplastic resin is at least one resin selected from the group consisting of polyesters, polyarylates, polycarbonates, polyphenylene sulfides, polysulfones, polyphenylene oxides, polyamides, polyimides, polyetherketones, polyamide-type elastomers, polyester-type elastomers, alpha-olefin polymers, alpha-olefin copolymers and modification products of these.

For example, to improve the modulus of elasticity of the block copolymer above the glass transition temperature, it may be used in combination with a polyarylate, a polyphenylene oxide, a polyimide, a polysulfone or a polyetherketone. To improve its toughness, it may be used in combination with an alpha-olefin polymer or copolymer or a modification product thereof, a polyamide elastomer, a polyester elastomer, a polycarbonate, a polyester or a polyamide.

The polyester is a polymer or a copolymer obtained by condensation reaction of a dicarboxylic acid and a diol as main components.

Examples of the polyester used in this invention are polyesters obtained from dicarboxylic acids such as terephthalic acid, isophthalic acid, orthophthalic acid, naphthalenedicarboxylic acid, 4,4'-diphenyldicarboxylic acid, diphenylether dicarboxylic acid, alpha,beta-bis(4-carboxyphenoxy)ethane, adipic acid, sebacic acid, azelaic acid, decanedicarboxylic acid, dodecanedicarboxylic acid, cyclohexanedicarboxylic acid and dimeric acid or ester-forming derivatives thereof and glycols such as ethylene glycol, propylene glycol, butanediol, pentanediol, neopentyl glycol, hexanediol, octanediol, decanediol, cyclohexanedimethanol, hydroquinone, bisphenol A, 2,2-bis(4'-hydroxyethoxyphenyl)propane, xyleneglycol, polyethylene ether glycol, polytetramethylene ether glycol and aliphatic polyester oligomers in which both terminals are hydroxyl groups. They may be obtained by using a polyfunctional ester-forming component such as trimethylolpropane, trimethylolethane, glycerol, pentaerythritol, trimellitic acid, trimesic acid and pyromellitic acid in amounts within which thermoplasticity can be retained.

Usually, the polyesters used in this invention have an inherent viscosity [$\eta$], determined at 30° in a 6:4 mixture of phenol and tetrachloroethane at 30° C., of 0.3 to 1.5 dl/g. Especially preferred polyesters include, for example, polyethylene terepthalate, polybutylene terephthalate, polyhexamethylene terephthalate, poly(ethylene-butylene terephthalate), poly(cyclohexane dimethylene terephthalate), 2,2-bis(beta-hydroxyethoxytetrabromophenyl)poropane copolymerized polybutylene terephthalate.

Liquid crystalline polyesters may be used as the above polyesters. The liquid crystalline polyesters denote aromatic polyesters capable of forming an anisotropic molten phase at a temperature of less than about 400° C., and may comprise the following recurring moieties I and II as essential components.

I: 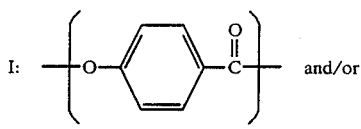 and/or

II: at least one of

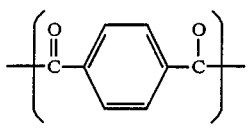

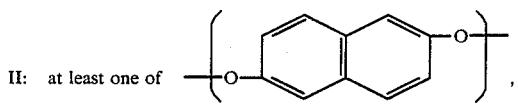

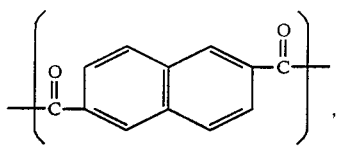

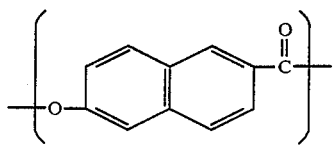

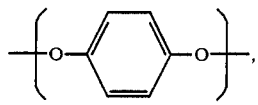

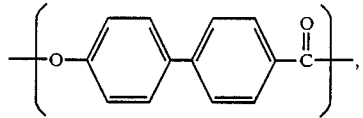

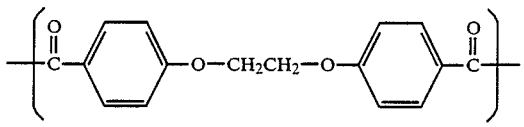

and

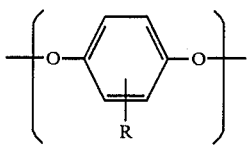

(R is methyl, chloro, bromo or a mixture thereof and replaces hydrogen on the armatic ring).

The temperature at which the aromatic polyester form an anisotropic molten phase is not more than about 400° C., preferably 260° to 350° C., especially preferably 280° to 330° C.

The polyarylates are polyesters synthesized from bisphenols or their derivatives and dibasic acids or their derivatives.

Examples of the bisphenols include 2,2-bis-(4-hydroxyphenyl)propane, 4,4'-dihydroxy-diphenyl ether, 4,4'-dihydroxy-3,3'-dimethyldiphenyl ether, 4,4'-dihydroxy-3,3'-dichlorodiphenyl ether, 4,4'-dihydroxy-diphenylsulfide, 4,4'-dihydroxy-diphenylsulfone, 4,4'-dihydroxydiphenylketone, bis-(4-hydroxyphenyl)methane, 1,1-bis-(4-hydroxyphenyl)ethane, 1,1-bis-(4-hydroxyphenyl)-n-heptane, di-(4-hydroxyphenyl)cyclohexylmethane, 1,1-bis-(4-hydroxyphenyl)-2,2,2-trichloroethane, 2,2-bis-(4-hydroxy-3,5-dibromophenyl)propane, and 2,2-bis-(4-hydroxy-3,5-dichlorophenyl)propane. Especially preferred is 2,2-bis-(4-hydroxyphenyl)propane, called bisphenol A.

Known aromatic or aliphatic dicarboxylic acids may be used as the dibasic acids. Examples of the aromatic dicarboxylic acids include phthalic acid, isophthalic acid, terephthalic acid, bis-(4-carboxy)diphenyl, bis-(4-carboxyphenyl)ether, bis-(4-carboxyphenyl)sulfone, bis-(4-carboxyphenyl)carbonyl, bis-(4-carboxyphenyl)methane, bis-(4-carboxyphenyl)dichloromethane, 1,2- and 1,1-bis-(4-carboxyphenyl)ethane, 1,2- and 2,2-bis-(4-carboxyphenyl)propane, 1,2- and 2,2-bis-(3-carboxyphenyl)propane, 2,2-bis-(4-carboxyphenyl)-1,1-dimethylpropane, 1,1- and 2,2-bis-(4-carboxyphenyl)butane, 1,1- and 2,2-bis-(4-carboxyphenyl)pentane, 3,3-bis-(4-carboxyphenyl)heptane, and 2,2-bis-(4-carboxyphenyl)heptane. Examples of the aliphatic dicarboxylic acids are oxalic acid, adipic acid, succinic acid, malonic acid, sebacic acid, glutaric acid, azelaic acid and suberic acid. Isophthalic acid, terephthalic acid and derivatives of these are preferred.

Homopolycarbonate and copolycarbonates having at least one bisphenol as a base may be used as the polycarbonates (to be sometimes abbreviated as PC) used in this invention. Examples of such a bisphenol include hydroquinone, resorcinol, dihydroxydiphenyl, bis(hydroxyphenyl)alkanes, bis-(hydroxyphenyl)cycloalkanes, bis-(hydroxyphenyl)sulfides, bis-(hydroxyphenyl)ketones, bis-(hydroxyphenyl)ether, bis-(hydroxyphenyl)sulfoxide, bis-(hydroxyphenyl)sulfone and alpha,alpha'-bis-(hydroxyphenyl)diisopropylbenzene, and nuclearly alkyl- or halogen substituted products of these compounds.

Specific examples of preferred bisphenols among them include 4,4-dihydroxydiphenyl, 2,2-bis-(4-hydroxyphenyl)propane, 2,4-bis-(4-hydroxyphenyl)-2-methylbutane, 1,1-bis-(4-hydroxyphenyl)cyclohexane, alpha,alpha'-bis-(4-hydroxyphenyl)-p-diisopropylbenzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)sulfone, 2,4-bis-(3,5-dimethyl-4-hydroxyphenyl)-2-mercaptan, 1,1-bis-(3,5-dimethyl-4-hydroxyphenyl)cyclohexane, alpha,alpha'-bis-(3,5-dimethyl-4-hydroxyphenyl)-p-diisopropylbenzene, 2,2-bis-(3,5-dichloro-4-hydroxyphenyl)propane and 2,2-bis-(3,5-dibromo-4-hydroxyphenyl)propane. Especially preferred are 2,2-bis-(4-hydroxyphenyl)propane, 2,2-bis-(3,5-dimethyl-4-hydroxyphenyl)propane, 2,2-bis-(3,5-dimethyl-4-hydroxyphenyl)propane, 2,2-bis-(3,5- dibromo-4-hydroxyphenyl)phenyl)propane and 1,1-bis-(4 hydroxyphenyl)cyclohexane.

Preferred polycarbonates are those based on the above preferred bisphenols. A copolymer of 2,2-bis-(4hydroxyphenyl)propane and one of the above especially preferred other bisphenols mentioned above is an especially preferred copolycarbonate.

Other particularly preferred polycarbonates are based on 2,2-bis-(4-hydroxyphenyl)propane or 2,2-bis-(3,5-dimethyl-4-hydroxyphenyl)propane alone as a base.

PC can be produced by a known method, for example, by ester-interchange reaction between the bisphenol and diphenyl carbonate in the molten state or by two-phase interfacial polymerization of the bisphenol and phosgene.

The polyphenylene oxides are also called polyphenylene ethers. For example, they are polymers of 2,6-disubstituted phenols of the general formula

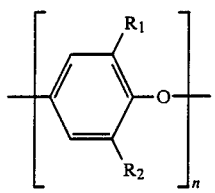

wherein $R_1$ and $R_2$ each represent hydrogen, halogen, alkyl, haloalkyl or alkoxy having not more than 4 carbon atoms, or an allyl derivative or aralkyl group having not more than 9 carbon atoms, and n represents the number of recurring units and is an integer of at least 10, and copolymers of 2,6-disubstituted phenols and polyhydric phenols. These polymers usually have a molecular weight of at least 2,000, preferably 1,000 to 35,000. Generally, these resins may be obtained by dehydration reaction of phenols such as phenol, 2,6-dimethylphenol, 2,6-diethylphenol, 2,6-diisopropylphenol or 2-methyl-6-methoxyphenol with oxygen in the presence of a promoter such as metal/amine or metal chelate/basic organic compound. Any method of production, however, may be applied if the resulting polyphenylene oxides meet the aforesaid conditions. Specific examples of the polyphenylene sulfides are 2,6-dimethylphenylene oxide polymer, 2,6-dimethylphenol/bisphenol A (former/latter-95/5 mole ratio) copolymer and 2,6-diethylphenylene oxide polymer. Polyphenylene oxide having styrene grafted thereto may also be used. Various known polyamide resins may be used as the polyamide resins in this invention. They may be obtained, for example, by polycondensation between dicarboxylic acids such as terephthalic acid, isophthalic acid, oxalic acid, adipic acid, sebacic acid and 1,4-cyclohexyldicarboxylic acid and diamines such as ethylenediamine, pentamethylenediamine, hexamethylenediamine, decamethylenediamine, 1,4-cyclohexyldiamine and m-xylylenediamine; polymerization of cyclic lactams such as caprolactam and laurolactam; polycondensation of aminocarboxylic acids such as aminoenanethoic nonanoic acid and aminoundecanoic acid; or the copolymerization of the above cyclic lactams, dicarboxylic acids and diamines. Specific examples include 6 nylon, 66 nylon, 610 nylon, 612 nylon, 11 nylon, 12 nylon, 96/610 copolymerized nylon and 6/66 copolymerized nylon. Especially preferred are 6 nylon, 66 nylon and 12 nylon. Substantially amorphous polyamide resins obtained by the polycondensation of cyclic lactams such as laurolactam, aromatic dicarboxylic acids such as terephthalic acid and isophthalic acid and alicyclic aliphatic diamines such as 4,4'-diamino-3,3'-dimethylcyclohexylmethane or the polycondensation of asymmetric diamines such as trimethylhexamethylenediamine and aromatic diamines are also suitable for use in the present invention.

The polyimides that may be used in this invention include, for example,

[I] polyimides having recurring units represented by the following general formula

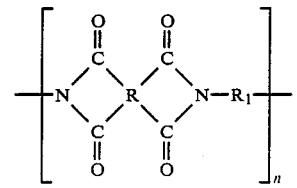

wherein R represents a tetravalent aromatic or alicyclic group containing at least one 6-membered carboxylic ring, $R_1$ represents a divalent benzenoid group represented by

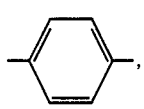

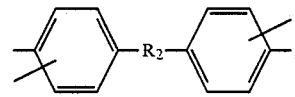

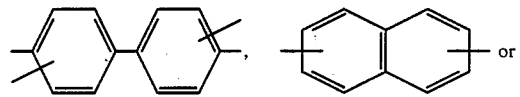

$R_2$ represents a divalent group selected from $-O-13$,

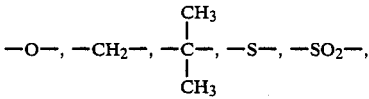

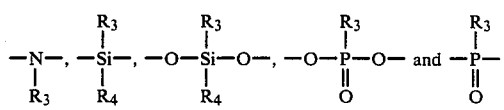

in which $R_3$ and $R_4$ are selected from alkyl and aryl groups, and n is an integer of at least 2 at which the polymer becomes thermally stable at least at about 200° C.;

[II] polyimides having recurring units represented by the general formula

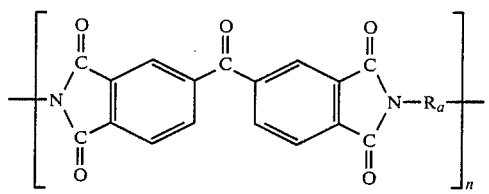

wherein $R_a$ represents

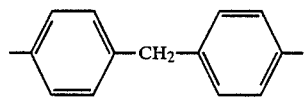

in 10 to 90% of the recurring units, and

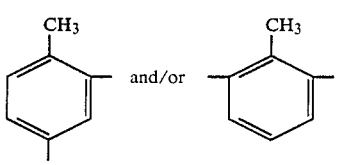  and/or in the remaining portion of the recurring units, and n is an integer of 2 or more at which the polymer becomes thermally stable at least at about 200° C.;

[III] polyamideimides having recurring units represented by the general formula

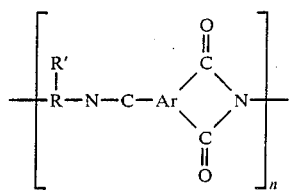

wherein Ar represents a trivalent aromatic group containing at least one 6-membered carboxylic ring, R represents a divalent aromatic and/or aliphatic group, R' represents hydrogen, a methyl group or a phenyl group, and n is an integer of at least 2; and

[IV] polyetherimides having recurring units represented by the general formula

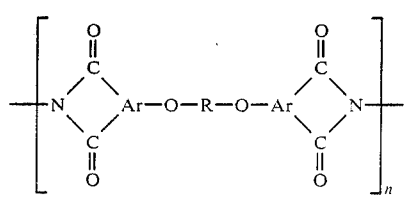

wherein Ar represents a trivalent aromatic group containing at least one 6-membered carboxylic ring, and R represents a divalent aromatic and/or aliphatic group.

The polysulfones are defined as polyarylene compounds in which arylene units are positioned at random or in an orderly fashion together with ether and sulfone linkages. Examples are polyarylene compounds having structural formulae ① to ⑯ below in which n represents an integer of at least 10. Those having the structures ① and ⑥ are preferred.

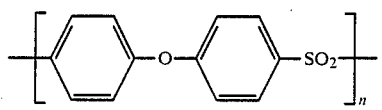 ①

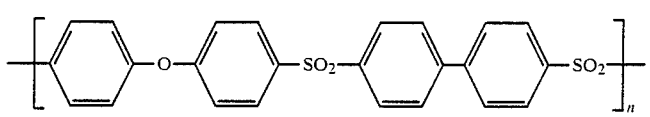 ②

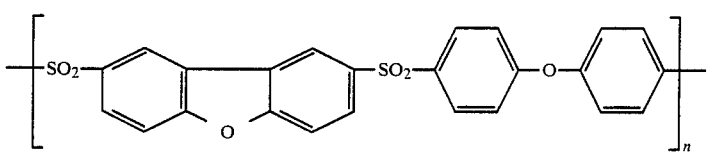 ③

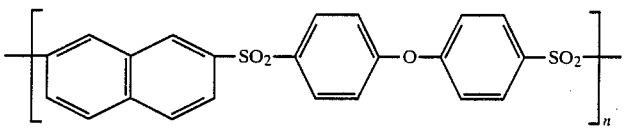 ④

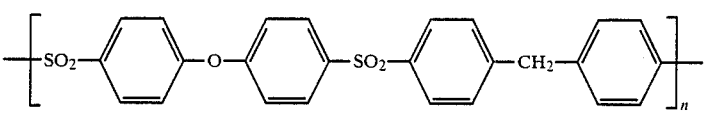 ⑤

-continued
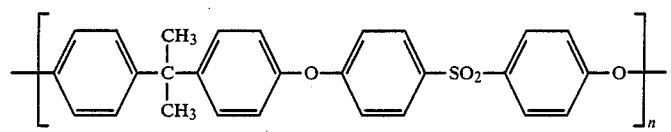
(6)
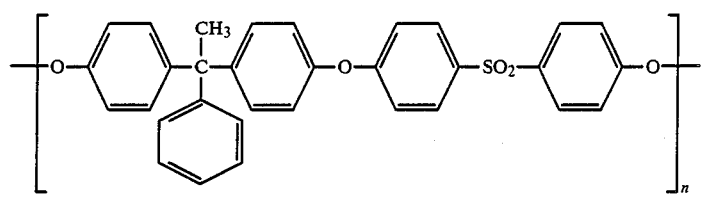
(7)
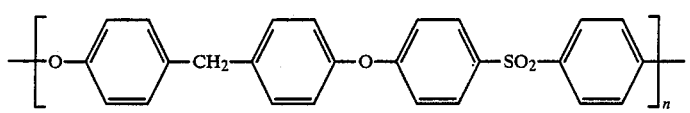
(8)
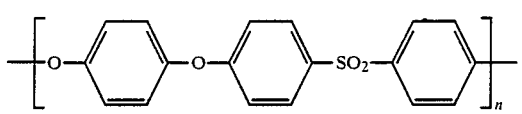
(9)
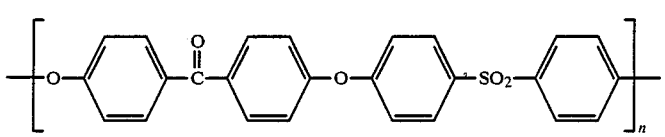
(10)
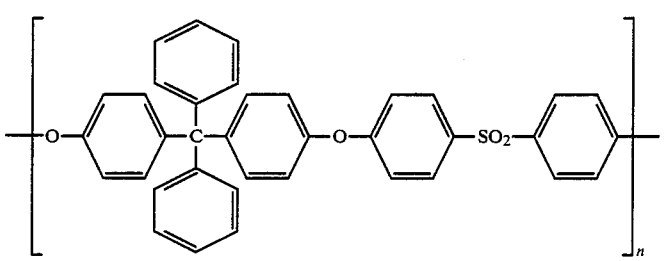
(11)
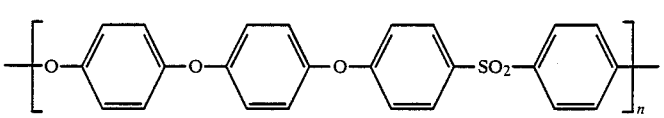
(12)
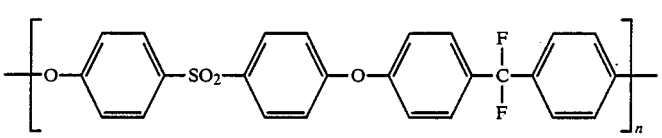
(13)
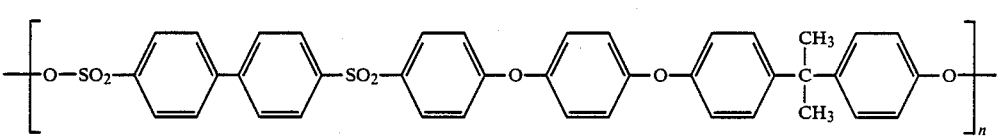
(14)
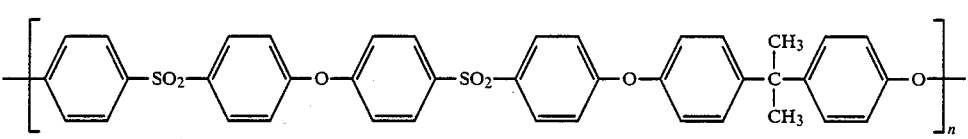
(15)

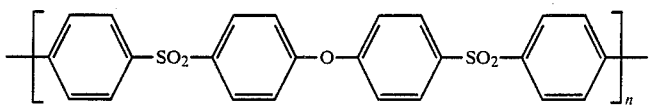

(16)

The polyetherketones are tough crystalline thermoplastic aromatic polyetherketones having an inherent viscosity (I.V.) of at least 0.7 and containing recurring units of formula [1]

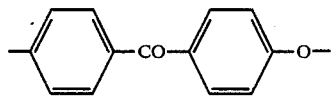

[1]

and/or recurring units of formula [2]

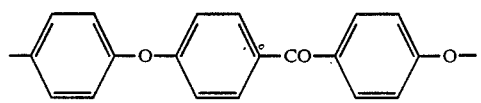

[2]

either alone or in combination with other recurring units. Examples of the other recurring units are units of the following formulae [3] and [4].

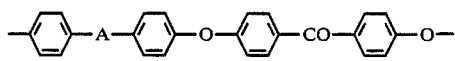

[3]

wherein A represents a direct bond, oxygen, sulfur, —SO$_2$—, —CO— or a divalent hydrocarbon group, and

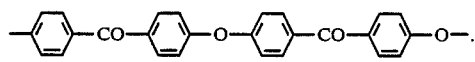

[4]

Other recurring units include

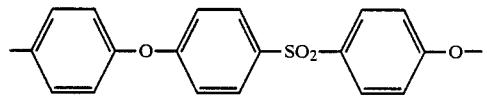

[5]

and/or

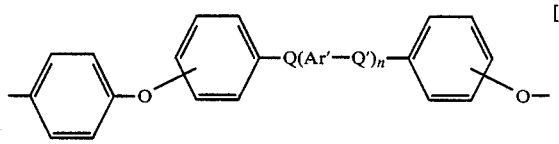

[6]

wherein the oxygen atom in the subunits

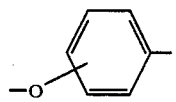

is at the ortho- or para-position to the group Q or Q', Q and Q' are identical or different and represent —CO— or —SO$_2$—, Ar' represents a divalent aromatic group and n is 0, 1, 2 or 3.

The polyamide-type elastomers are elastomers of block copolymers composed of hard segments consisting of nylon 11 and 12 and soft segments consisting of polyethers or polyesters. Specific examples of the polyether component are polymer structures of the formula —OR)$_n$ in which R is an alkylene group having 2 to 12 carbon atoms. Specific examples of the polyester component are polymer components obtained by using polycaprolactone or HO—R—OH (in which R represents an alkylene group having 2 to 12 carbon atoms) and (R$_1$—COOH)$_{2-3}$ in which R$_1$ represents an alkylene or cycloalkylene group having 2 to 25 carbon atoms as starting components. A typical example is one sold under the tradename "GRILAMID" by EMS Chemie. A random copolymer of nylon 6, nylon 66, nylon 610, nylon 11 and nylon 13 may also be used.

The polyester-type elastomers are block copolymers of high-melting hard segments composed mainly of alkylene terephthalate units and soft segments consisting of aliphatic polyesters or polyethers.

Examples of the high-melting segments composed mainly of alkylene terephthalate units are segments composed mainly of units derived from terephthalic acid and alkylene glycols such as ethylene glycol, propylene glycol, tetramethylene glycol, pentamethylene glycol, 2,2-dimethyl-trimethylene glycol, hexamethylene glycol and decamethyene glycol. As required, they may contain small amounts of aromatic dicarboxylic acids such as isophthalic acid, 1,5-naphthalenedicarboxylic acid, 2,6-naphthalenedicarboxylic acid, dibenzoic acid, bis(p-carboxyphenyl)methane or 4,4'-sulfonyldibenzoic acid or aliphatic dicarboxylic acids to be described below as dicarboxylic acids, diols such as p-xylylene glycol or cyclohexanedimethanol as glycols, and p-hydroxybenzoic acid, or p-(beta-hydroxyethoxy)-benzoic acid as hydroxycarboxylic acids.

Examples of the low-melting soft segments composed of aliphatic polyesters or polyethers are polyether glycols such as poly(ethylene oxide)glycol, poly(propylene oxide)glycol and poly(tetramethylene oxide)glycol, mixtures or copolymers of these polyether glycols, polyesters produced from aliphatic dicarboxylic acids having 2 to 12 carbon atoms and aliphatic glycols having 2 to 10 carbon atoms (for example, polyethylene adipate, polytetramethylene adipate, polyethylene sebacate, polyneopentyl sebacate, polytetramethylene dodecanoate, polytetramethylene azeleate, polyhexamethylene azeleate and polyepsilon-caprolactane), and polyester polyether copolymers derived from the above aliphatic polyesters and aliphatic polyethers.

In the polyester-type block copolymer, the low-melting soft segments preferably have a molecular weight of 400 to 6,000, and exist in the copolymer in a proportion of 5 to 80 % by weight.

The alpha-olefin polymers or copolymers should contain at least 50 mole % of an alpha-olefin (such as ethylene, propylene, butene-1, isobutene, pentene-1, hexene-1, decene-1, 4-methylbutene-1, 4-methylpentene-1, 4,4-dimethylpentene-1, vinylcyclohexane, styrene, alphamethylstyrene, and styrene or the like substituted by a lower alkyl group). Mixtures of the above olefins may also be used. Modification products of these alpha-olefin polymers or copolymers obtained by grafting unsaturated carboxylic acids or unsaturated epoxy compounds can also be used conveniently. Examples of the unsaturated carboxylic acids are citraconic anhydride, 3-methyl-4-cyclohexene-1,2-dicarboxylic anhydride (to be referred to as PMMA), maleic anhydride (methyl)Nadic anhydride, and itaconic anhydride. Examples of the unsaturated epoxy compounds are glycidyl acrylate and glycidyl methacrylate. These unsaturated grafting compounds may be used in an amount of usually 0.1 to 2.0 parts by weight, preferably 0.2 to 1.5 parts by weight, per 100 parts by weight of the alpha-olefin polymer or copolymer. Polyphenylene sulfide and polyphenylene sulfide sulfone may be the same as PPS and PPSS constituting the block copolymer used as an essential component in the present invention.

The weight ratio of the block copolymer to the other thermoplastic resin is from 99/1 to 1/99, preferably from 80/20 to 20/80.

Examples of the inorganic filler that can be used in this invention include fibrous reinforcing materials (such as glass fibers, carbon fibers, potassium titanate, asbestos, silicon carbide, ceramic fibers, metallic fibers, silicon nitride and aramid fibers), barium sulfate, calcium sulfate, kaolin, clay, pyrophillite, bentonite, sericite, mica, nepheline syenite, talc, attapulgite, wollastonite, processed mineral fibers (PMF), ferrite, calcium silicate, calcium carbonate, magnesium carbonate, dolomite, antimony trioxide, zinc oxide, titanium dioxide, magnesium oxide, iron oxide, molybdenum disulfide, graphite, gypsum, glass beads, glass balloons and quartz powder. Generally, the fibrous reinforcing material alone or a mixture of it with at least one other inorganic filler may be used.

The amount of the inorganic filler used is up to 280 parts by weight, preferably 10 to 250 parts by weight, per 100 parts by weight of the block copolymer or a mixture of it with the other thermoplastic resin. In particular, for preparing an injection-moldable composition, the inorganic filler is preferably used in an amount of 10 to 230 parts by weight. If the amount of the filler is too small, its reinforcing effect is not sufficient. If it is too large, the melt viscosity of the composition increases to impair moldability.

The composition of this invention may contain small amounts of other additives which do not impair the object of this invention, such as mold releasing agents, coloring agents, heat stabilizers, ultraviolet stabilizers, blowing agents, corrosion inhibitors and fire retardants.

The composition of this invention may be prepared by various known methods. For example, the starting materials are uniformly mixed in a mixer such as a tumbler or a Henschel mixer, and the mixture is fed into a single-screw or twin-screw extruder and melt-kneaded at 230° to 400° C. The kneaded mixture is then pelletized.

The following examples illustrate the present invention more specifically.

EXAMPLES 1-8 AND COMPARATIVE EXAMPLES 1-4

(A) Synthesis of chlorophenyl-terminated PPSS

A 10-liter autoclave was charged with 1,980 g of N-methylpyrrolidone, 388 g (5.0 moles) of sodium hydrosulfide 1.2-hydrate, 200 g of sodium hydroxide and 143.6 g (5.0 moles) of bis(p-chlorophenyl)sulfone, and they were reacted at 200° C. for 6 hours. Furthermore, 72 g (0.25 mole) of bis(p-chlorophenyl)sulfone and 200 g of N-methylpyrrolidone were added and reacted at 200° C. for 1 hour to give a sulfide sulfone polymer.

(B) Synthesis of sodium sulfide-terminated PPS

A 10-liter autoclave was charged with 3,100 g of N-metylpyrrolidone, 597.5 g (7.7 moles) of sodium hydrosulfide 1.2-hydrate and 308 g of sodium hydroxide, and the temperature of the reaction mixture was elevated while distilling water. At 220° C., 1,029 g (7.0 moles) of p-dichlorobenzene and 700 g of N-methylpyrrolidone were added and reacted at 260° C. for 2 hours to give polyphenylene sulfide.

(C) Synthesis of a block copolymer

The sulfide sulfone polymer reaction mixture and the polyphenylene sulfide polymer reaction mixture obtained as above were put in an autoclave and reacted at 220° C. for 3 hours, and purified by a known method to give a block copolymer (a) in which the amount of the polyphenylene sulfide sulfone segments was about 50% by weight (as charged). The melt viscosity of the polymer, measured by a Koka-type flow tester, was 600 poises at 300° C.

The polymer (a) was cured by heating it at 260° C. in air for a predetermined period of time to obtain a block copolymer (b) having a melt flow rate, determined by ASTM D-1238-74 (315.6° C., 5 kg load), of 170 (g/10 min.).

In each run, the block copoylmer (a) or (b) was mixed uniformly with the materials indicated in Table 1 in the proportions indicated. The mixture was melt-kneaded at 310° C. by an extruder having a cylinder diameter of 40 mm, and pelletized. Test specimens were prepared from the pellets by using an injection molding machine at a cylinder temperature of 310° C. The appearance of the molded product and its flexural strength in accordance with ASTM D-790 are shown in Table 1.

Table 1 shows that the compositions of this invention give molded articles having a good appearance and an excellent flexural strength.

TABLE 1

| | Comp. Ex. 1 | Comp. Ex. 2 | Ex. 1 | Ex. 2 | Ex. 3 | Ex. 4 | Comp. Ex. 3 | Ex. 5 | Ex. 6 | Comp. Ex. 4 | Ex. 7 | Ex. 8 |
|---|---|---|---|---|---|---|---|---|---|---|---|---|
| Cured block copolymer (b) | 100 | 100 | 100 | 100 | 100 | 100 | 100 | 100 | — | — | — | — |
| Uncured block copolymer (a) | — | — | — | — | — | — | — | — | 100 | 100 | 100 | 100 |
| Epiclon N-775[*1] | — | — | 5 | 0.5 | 5 | 15 | 30 | 5 | 5 | 5 | 5 | — |
| Epiclon 1050[*2] | — | — | — | — | — | — | — | — | — | — | — | 5 |
| Glass fibers[*3] | — | 70 | — | 70 | 70 | 70 | 70 | 20 | 100 | 100 | 70 | 70 |
| Mica[*4] | — | — | — | — | — | — | — | — | — | 100 | 200 | — | — |
| Appearance of the molded article | Good | Poor | Good | Good | Good | Good | Slightly poor | Good | Good | Poor | Good | Good |
| Flexural strength | 560 | 1400 | 1100 | 1670 | 2020 | 1910 | 1600 | 1030 | 1680 | — | 2080 | 1720 |

TABLE 1-continued

| | Comp. Ex. 1 | Comp. Ex. 2 | Ex. 1 | Ex. 2 | Ex. 3 | Ex. 4 | Comp. Ex. 3 | Ex. 5 | Ex. 6 | Comp. Ex. 4 | Ex. 7 | Ex. 8 |
|---|---|---|---|---|---|---|---|---|---|---|---|---|
| (kg/cm$^2$) | | | | | | | | | | | | |
| Remarks | | Color non-uniformity | | | | | Burn and color non-uniformity | | | Short shot | | |

(*1) Epoxy resin produced by Dainippon Ink and Chemicals, Inc.
(*2) Epoxy resin produced by Dainippon Ink and Chemicals, Inc.
(*3) Chopped strands (3 mm in length) produced by Asahi Fiberglass Co., Ltd.
(*4) Mica having a particle size smaller than 325 mesh (a product of Marietta Resources INTL, Canada)

EXAMPLES 9-12 AND COMPARATIVE EXAMPLE 5

(A) Synthesis of chlorophenyl-terminated PPSS

A 10-liter autoclave was charged with 1,980 g of N-methylpyrrolidone, 655 g (5.0 moles) of sodium sulfide 2.7-hydrate, 2.0 g of sodium hydroxide and 1,436 g (5.0 moles) of bis(p-chlorophenyl)sulfone, and in an atmosphere of nitrogen, the temperature of the mixture was elevated to 200° C. At this temperature, the mixture was reacted for 6 hours with stirring. A solution of 72 g (0.25 mole) of bis(p-chlorophenyl)sulfone in 200 g of N-methylpyrrolidone was added to the mixture and the reaction was carried out further for 1 hour. The autoclave was cooled, and the reaction mixture was taken out. It was washed several times with hot water and acetone, and the resulting polymer cake was separated by filtration. The cake was dried under reduced pressure at 80° to 150° C. to give 1,190 g (yield 96%) of a pale brown polymer had a logarithmic viscosity of $\eta_{inh}$ of 0.22.

The logarithmic viscosity of the polymer was calculated from the equation $\eta_{inh}=\ln$ (relative viscosity)/polymer concentration in which the relative viscosity was determined at 206° C. for a solution of the polymer in a 3:2 by weight mixture of phenol/1,1,2,2-tetrachloroethane in a polymer concentration of 0.5 g/100 ml of solution.

(B) Synthesis of sodium sulfide-terminated PPS

A 10-liter autoclave was charged with 3,100 g of N-methylpyrrolidoine, 1,009 g (7.7 moles) of sodium sulfide 2.7-hydrate and 3.5 g (0.09 mole) of sodium hydroxide, and in an atmosphere of nitrogen, the temperature of the mixture was elevated to 250° C. with stirring over the course of about 2 hours to distill 220 ml of water. The reaction mixture was cooled to 150° C., and 1,029 g (7.0 moles) of p-dichlorobenzene and 700 g of N-methylpyrrolidone were added. The mixture was reacted at 230° C. for 1.5 hours and then at 260° C. for 2 hours. At the end of the polymerization, the pressure of the inside of the autoclave was 7.0 kg/cm$^2$. The autoclave was cooled, and part of the polymerization product in it was sampled. The sample was separated by filtration, and the cake was boiled and washed three times with hot water, and further washed twice with acetone. The washed product was dried at 120° C. to give a pale grayish brown powdery PPS polymer in a yield of about 94%. The resulting polymer had a logarithmic viscosity $[\eta]$ of 0.14.

The logarithmic viscosity $[\eta]$ of the polymer was calculated in accordance with the equation $[\eta]=\ln$ (relative viscosity)/polymer concentration in which the relative viscosity was determined at 206° C. for a solution of the polymer in alpha-chloronaphthalene in a polymer concentration of 0.4 g/100 ml of solution.

(C) Synthesis of a blocked copolymer

The above chlorophenyl-terminated PPSS (300 g) and 1,200 g of N-methylpyrrolidone were added to 2,370 g of the above PPS reaction product. After purging with nitrogen, the reactor was sealed up and the temperature was elevated to 220° C. The mixture was reacted at this temperature for 3 hours. The reactor was cooled, and the reaction mixture was separated by filtration. The solid product was washed twice with N-methylpyrrolidone and further boiled and washed three times with hot water. The resulting cake was dried at 120° C. for 5 hours to obtain 486 g of a pale brown powdery polymer having an $[\eta]$ of 0.19.

In the infrared absorption spectrum of this polymer, peaks other than those assigned to the absorptions of PPS and PPSS were not observed. From the intensities of characteristic absorptions seen at 1320, 620 and 480 cm$^{-1}$, PPSS was quantitatively determined. Its content in the polymer was found to be 46.0% by weight. The amount of sulfur was determined by elemental analysis of the polymer to be 27.87% by weight. Accordingly, the amount of PPSS in the polymer was determined to be 46.0% by weight.

The polymer, referred to as block coopolymer (c), had a melt viscosity of 520 poises.

The block copolymer (c) was cured by heating it in air at 270° C. for 2.5 hours to give a block copolymer (d) having a melt viscosity of 3,100 poises.

In each run, the block copolymer (c) or (d) was premixed uniformly with the maleimide compound or carbodiimide compound indicated in Table 2 in the proportions indicated. The mixture was then kneaded and pelletized in an extruder having a cylinder diameter of 40 mm and heated at 300° C. The pellets were extruded by using an extruder having a cylinder diameter of 40 mm and heated at 300° C. to form a sheet-like extrudate having a thickness of 2 mm and a width of 100 mm. A test piece was cut out from the sheet, and its flexural strength was measured. The measured flexural strength and extrusion characteristics are shown in Table 2.

TABLE 2

| | | Example 9 | Example 10 | Comparative Example 5 | Example 11 | Example 12 |
|---|---|---|---|---|---|---|
| Blending (parts by weight) | Block copolymer (c) | 100 | — | — | — | 100 |
| | Block copolymer (d) | — | 100 | 100 | 100 | — |
| | N,N'-(Methylene-di-p-phenylene)dimaleimide | 15 | 3 | — | — | 10 |
| | di-(2,6-Diethyl | — | — | — | 3 | — |

TABLE 2-continued

| | Example 9 | Example 10 | Comparative Example 5 | Example 11 | Example 12 |
|---|---|---|---|---|---|
| phenyl)cardodiimide | | | | | |
| Triisopropyl benzene polycarbodiimide | — | — | — | — | 3 |
| Melt viscosity of the pellets (poises) | 2300 | 5400 | 2900 | 4700 | 2400 |
| Extrudability of the sheet | Good | Good | The amount of extrusion was not constant, and a good sheet could not be obtained. | Good | Good |
| Flexural strength of the sheet (kg/cm$^2$) | 800 | 850 | 690 | 820 | 830 |

EXAMPLE 13

Pellets were prepared from a blend of 100 parts by weight of the block copolymer (c) obtained in Example 9 and 4 parts by weight of N,N'-(methylene di-p-phenylene)dimaleimide. Sixty parts by weight of the pellets were pre-mixed uniformly with 40 parts by weight of glass fibers (3 mm) treated with epoxysilane, and the mixture was kneaded and pelletized in an extruder having a cylinder diameter of 40 mm and heated at 300° C. A test piece was prepared from the pellets by using an injection molding machine, and its flexural characteristics were measured. It was found to have a flexural strength of 2,350 kg/cm$^2$ and a flexural deflection of 2.50 mm.

EXAMPLES 14–19 AND COMPARATIVE EXAMPLE 6

In the production of the block copolymer in Example 1, PPS and PPSS were reacted in a weight ratio of 1:1 to give a block copolymer having a melt viscosity at 300° C. of 80 poises.

In each run, 100 parts by weight of the resulting block copolymer, 70 parts by weight of glass fibers (13 microns in diameter) having a length of 3 mm and each of the organosilanes shown in Table 3 in the amounts indicated wee uniformly mixed. The mixture was melt-kneaded and pelletized at 340° C. using an extruder having a cylinder diameter of 65 mm. A test piece was prepared from the pellets by injection molding at 320° C., and its properties were measured. The results are shown in Table 3.

TABLE 3

| | Organosilane | | Water absorption (%)(*1) | Heat distortion temperature (°C.)(*2) | Cracking resistance (cycles) (*3) | Flexural strength (kg/cm$^2$) |
|---|---|---|---|---|---|---|
| | Type | Amount (parts by weight) | | | | |
| Example 14 | beta-(3,4-Epoxycyclohexyl)ethyltrimethoxysilane | 0.1 | 0.18 | 188 | 8 | 1430 |
| Example 15 | beta-(3,4-Epoxycyclohexyl)ethyltrimethoxysilane | 1.0 | 0.12 | 220 | >20 | 1720 |
| Example 16 | beta-(3,4-Epoxycyclohexyl)ethyltrimethoxysilane | 10.0 | 0.10 | 225 | >20 | 1750 |
| Example 17 | gamma-Aminopropyltriethoxysilane | 1.0 | 0.15 | 215 | >20 | 1680 |
| Example 18 | gamma-Chloropropyltrimethoxysilane | 1.0 | 0.10 | 223 | >20 | 1720 |
| Example 19 | N-beta-(N-Vinylbenzylamino)ethyl-delta-aminopropyltrimethoxysilane | 1.0 | 0.13 | 210 | >20 | 1640 |
| Comparative Example 6 | None | — | 0.31 | 165 | 2 | 1180 |

Molding conditions were:
Cylinder temperature 320° C.
Mold temperature 170° C.
Injection temperature 150 kg/cm$^2$

EXAMPLES 20–22 AND COMPARATIVE EXAMPLES 7–9

In the same way as in Example, a block copolymer having a melt viscosity at 300° C. of 1,100 poises was prepared except that PPS and PPSS were reacted in a weight ratio of 3:1.

In each run, 100 parts by weight of the block copolymer, 150 parts of each of the fillers indicated in Table 4 and 2 parts of gamma-chloropropyltrimethoxysilane were uniformly mixed and test pieces were prepared from the mixture as in Examples 14 to 19. In Comparative Examples 7 to 9, no silane compound was added.

TABLE 4

| | Filler | | Water absorption (%)(*) | Volume inherent resistivity (ohms-cm)(*) |
|---|---|---|---|---|
| Run | Type | Amount (parts by weight) | | |
| Example 20 | glass fibers (100 microns thick) | 150 | 0.11 | 7 × 10$^{24}$ |
| Comparative | glass | " | 0.34 | 2 × 10$^{12}$ |

TABLE 4-continued

| Run | Filler Type | Amount (parts by weight) | Water absorption (%)(*) | Volume inherent resistivity (ohms-cm)(*) |
|---|---|---|---|---|
| Example 7 | fibers (100 microns thick | | | |
| Example 21 | fused silica glass beads | 75 | 0.08 | $1 \times 10^{15}$ |
| Comparative Example 8 | fused silica glass beads | " | 0.29 | $4 \times 10^{12}$ |
| Example 22 | mica | 150 | 0.17 | $8 \times 10^{13}$ |
| Comparative Example 9 | mica | " | 0.40 | $1 \times 10^{11}$ |

(*)Measured after the test pieces were subjected to a pressure cooker test (PCT, treatment at 121° C. and 2 atmospheres for 20 hours).

EXAMPLES 23-24 AND COMPARATIVE EXAMPLES 10-11

By the same reaction as in Example 1, chlorophenyl-terminated PPS (logarithmic viscosity $\eta_{inh}$, 0.22) was prepared.

The logarithmic viscosity of the polymer in this application was calculated in accordance with the equation $\eta_{inh}$=ln (relative viscosity)/polymer concentration in which the relative viscosity was determined at 206° C. for a solution of the polymer in a 3:2 by weight mixture of phenol/1,1,2,2-tetrachloroethane in a polymer concentration of 0.5 g/100 ml of solution.

Separately, a reactor was chargeed with 3,100 g of N-methylpyrrolidone, 1,009 g of sodium sulfide 2.7-hydrate and 3.5 g of sodium hydroxide, and in an atmosphere of nitrogen, the temperature of the mixture was elevated to 200° C. Then, 1,029 g of p-dichlorobenzene and 700 g of N-methylpyrrolidone were added, and the mixture was reacted at 260° C. to give chlorophenylterminated PPSS having a logarithmic viscosity of 0.14.

Then, 2,370 g of the PPS, 300 g of the PPSS and 200 g of N-methylpyrrolidone were reacted at 220° C. in an atmosphere of nitrogen to give 486 g of a block copolymer which contained 46% by weight of PPSS and had a logarithmic viscosity (measured at 206° C. in alpha-chloronaphthalene in a polymer concentration of 0.4 g/100 ml of solution) of 0.19.

In each run, the resulting block copolymer was blended in accordance with each of the compounding recipes shown in Table 5. The mixture was kneaded and pelletized at 290° C. by an extruder. Test pieces were prepared from the pellets, and their properties were measured. The results are shown in Table 5.

TABLE 5

| | Comp. Ex. 10 | Comp. Ex. 11 | Example 23 | Example 24 |
|---|---|---|---|---|
| Block copolymer (parts by weight) | 70 | 30 | 70 | 30 |
| Polysulfone[1] (parts by weight) | 30 | 70 | 30 | 70 |
| Bismaleimide[2] (parts by weight) | — | — | 3 | 3 |
| Evaluation of compatibility by the appearance of the molded article | Poor (hazy) | Poor (hazy) | Good | Good |
| Flexural strength (kg/cm²) | 850 | 950 | 1000 | 1150 |
| Izod impact strength (unnotched; kg-cm/cm) | 10 | 17 | 15 | 25 |
| Heat distortion temperature (18.6 kg/cm²; °C.) | 140 | 160 | 145 | 167 |

Note
[1] Polysulfone: Udel P-1700 by Nissan Chemical Co., Ltd.
[2] Bismaleimide has the structural formula

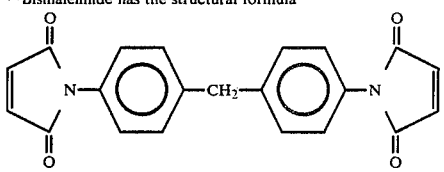

What we claim is:

1. A resin composition comprising:
   (a) 100 parts by weight of a block copolymer composed of polyphenylene sulfide segments and polyphenylene sulfide sulfone segments, said polyphenylene sulfide segments comprising a polymer having at least 70 mole % of recurring structural units of the formula

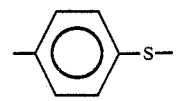

and said polyphenylene sulfide sulfone segments comprising a polymer having at least 70 mole % of recurring structural units of the formula

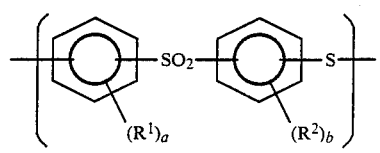

wherein groups bonded to both terminals of the polymer are ortho- or para- to the sulfone group, $R^1$ and $R^2$ represent hydrogen or a $C_1$-$C_8$ alkyl group and/or an aryl group, and a and b are integers of 0 to 4;
   (b) 0.01 to 20 parts by weight of at least one compound selected from the group consisting of maleimide compounds represented by the formula

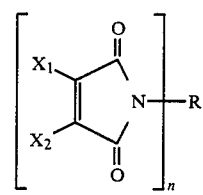

wherein R represents an aromatic, alicyclic or aliphatic organic group, $X_1$ and $X_2$ represent hydrogen, halogen or an alkyl group, and n is 1 to 10; and
   (c) 0 to 280 parts by weight of an inorganic filler.

2. The composition of claim 1, wherein the polyphenylene sulfide polymer of the block copolymer has a logarithmic viscosity of 0.03 to 0.80, the logarithmic viscosity being calculated from the equation logarithmic viscosity=ln (relative viscosity)/concentration of polyphenylene sulfide polymer, wherein the relative viscosity is determined at 206° C. for a solution of 0.4 g of polyphenylene sulfide polymer in 100 ml of alpha-chloronaphthalene.

3. The composition of claim 1, wherein the polyphenylene sulfide sulfone polymer of the block copolymer has a logarithmic viscosity of 0.05 to 1.0, the logarithmic viscosity being calculated from the equation logarithmic viscosity=ln (relative viscosity)/concentration of polyphenylene sulfide sulfone polymer, wherein the relative viscosity is determined at 30° C. for a solution of 0.5 g of polyphenylene sulfide sulfone polymer in 100 ml of a 3:2, by weight, mixture of phenol and 1,1,2,2-tetrachloroethane.

4. The composition of claim 1, wherein the weight ratio of said polyphenylene sulfide segments to said polyphenylene sulfide sulfone segments in the block copolymer is 199/99-1.

5. The composition of claim 1, wherein said block copolymer has a melt viscosity at 300° C. of 10 to 20,000 poises.

6. The composition of claim 1, wherein said maleimide compounds are compounds represented by the following formula

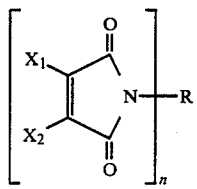

wherein R represents an aromatic group of not more than 14 carbon atoms, an alicyclic group of not more than 14 carbon atoms or an aliphatic group of not more than 14 carbon atoms, $X_1$ and $X_2$ each represent hydrogen, halogen or an alkyl group and n is 1 to 10.

7. The composition of claim 1, wherein the amount of each of said maleimide compounds is 0.1 to 15 parts by weight.

8. The composition of claim 1, wherein said inorganic filler is present in an amount of 10 to 250 parts by weight.

9. A molded article comprising the composition of claim 1.

10. A resin composition comprising:
(a) 99 to 1 parts by weight of a block copolymer composed of polyphenylene sulfide segments and polyphenylene sulfide sulfone segments, said polyphenylene sulfide segments comprising a polymer having at least 70 mole % of recurring structural units of the formula

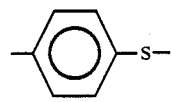

and said polyphenylene sulfide sulfone segments comprising a polymer having at least 70 mole % of recurring structural units of the formula

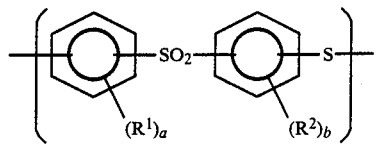

wherein groups bonded to both terminals of the polymer are ortho- or para- to the sulfone group, $R^1$ and $R^2$ represent hydrogen or a $C_1$-$C_8$ alkyl group and/or an aryl group, and a and b are integers of 0 to 4;
(b) 1 to 99 parts by weight of another thermoplastic resin;
(c) 0.01 to 20 parts by weight, per 100 parts by weight of the components (a) and (b) combined, of at least one compound selected from the group consisting of maleimide compounds represented by the formula

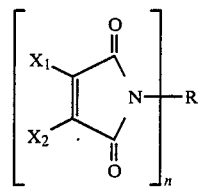

wherein R represents an aromatic, alicyclic or aliphatic organic group, $X_1$ and $X_2$ represent hydrogen, halogen or an alkyl group, and n is 1 to 10; and
(d) 0 to 280 parts by weight, per 100 parts by weight of the components (a) and (b) combined, of an inorganic filler.

11. The composition of claim 10, wherein said another thermoplastic resin is at least one thermoplastic resin selected from the group consisting of polyesters, polyphenylene sulfides, polyphenylene sulfide sulfones, polyamides, polyimides, polyphenylene oxides, polycarbonates, polysulfones, polyetherketones and alpha-olefin polymers.

12. A molded article comprising the composition of claim 10.

13. The composition of claim 11, wherein said polyester is a polyarylate.

14. The composition of claim 11, wherein said polyester is elastomeric.

15. The composition of claim 11, wherein said polyamide is elastomeric.

16. The composition of claim 11, wherein said alpha-olefin polymer is a graft copolymer obtained by grafting unsaturated carboxylic acids or unsaturated epoxy compounds onto an alpha-olefin polymer.

17. The composition of claim 11, wherein said alpha-olefin polymer is an alpha-olefin copolymer.

* * * * *

UNITED STATES PATENT AND TRADEMARK OFFICE
CERTIFICATE OF CORRECTION

PATENT NO. : 4,929,665

DATED : May 29, 1990

INVENTOR(S) : TOSHIO INOUE ET AL.

It is certified that error appears in the above-identified patent and that said Letters Patent is hereby corrected as shown below:

Column 29:
  Claim 4, line 4 of the claim, "199/99-1" should read --1-99/99-1--.

Signed and Sealed this

Twenty-third Day of July, 1991

Attest:

HARRY F. MANBECK, JR.

*Attesting Officer*    *Commissioner of Patents and Trademarks*